(12) United States Patent
Urbalejo et al.

(10) Patent No.: US 8,347,227 B2
(45) Date of Patent: Jan. 1, 2013

(54) GRAPHICALLY DISPLAYING MANUFACTURING EXECUTION SYSTEM INFORMATION DATA ELEMENTS ACCORDING TO A PRE-DEFINED SPATIAL POSITIONING SCHEME

(75) Inventors: Edward S. Urbalejo, Oceanside, CA (US); Anthony Keith Crouch, Laguna Hills, CA (US); Eric Paul Grove, Dallastown, PA (US); Diana Ivanov, Rancho Santa Margarita, CA (US); Philippe Lalonde, Montreal (CA); Steven Michael Weinrich, York, PA (US)

(73) Assignee: Invensys Systems, Inc., Foxboro, MA (US)

( * ) Notice: Subject to any disclaimer, the term of this patent is extended or adjusted under 35 U.S.C. 154(b) by 184 days.

(21) Appl. No.: 12/780,127

(22) Filed: May 14, 2010

(65) Prior Publication Data

US 2011/0047507 A1   Feb. 24, 2011

Related U.S. Application Data

(60) Provisional application No. 61/178,891, filed on May 15, 2009.

(51) Int. Cl.
   *G06F 3/048* (2006.01)
(52) U.S. Cl. .................................... 715/810; 707/805
(58) Field of Classification Search .................. 715/810; 707/805
   See application file for complete search history.

(56) References Cited

U.S. PATENT DOCUMENTS

| 5,319,395 | A | * | 6/1994 | Larky et al. ................... 345/605 |
| 5,440,686 | A | * | 8/1995 | Dahman et al. ............... 345/537 |
| 5,583,975 | A | * | 12/1996 | Naka et al. .................... 345/426 |
| 5,877,742 | A | * | 3/1999 | Klink ............................. 345/685 |
| 6,854,111 | B1 | | 2/2005 | Havner et al. |
| 2006/0101346 | A1 | | 5/2006 | Denzlein |
| 2008/0092131 | A1 | | 4/2008 | McIntyre et al. |
| 2008/0115082 | A1 | * | 5/2008 | Simmons et al. ............. 715/804 |
| 2008/0189637 | A1 | | 8/2008 | Krajewski et al. |
| 2009/0037848 | A1 | * | 2/2009 | Tewari et al. ................ 715/835 |
| 2009/0210071 | A1 | * | 8/2009 | Agrusa et al. .................... 700/9 |
| 2011/0009984 | A1 | * | 1/2011 | Mukhi et al. .................... 700/83 |
| 2011/0047507 | A1 | * | 2/2011 | Urbalejo et al. ............. 715/810 |
| 2011/0055771 | A1 | * | 3/2011 | Chen et al. ..................... 715/854 |

OTHER PUBLICATIONS

International Search Report and Written Opinion for PCT/US2010/034918 dated Dec. 23, 2010.

* cited by examiner

*Primary Examiner* — Doon Chow
*Assistant Examiner* — David Choi
(74) *Attorney, Agent, or Firm* — Edward S. Jarmolowicz

(57) ABSTRACT

A system and method are described that simplify defining/designing graphical display interfaces for graphically displaying related data elements. The displays provide both depictions of the data elements and the relationships between the data elements in accordance with a pre-defined data element display scheme including both element template (for particular data element types) and relationship view (spatial relationships within a display) definitions. A relationship view displays a set of provided data elements of specified type according to the element template and relationship view definitions.

21 Claims, 9 Drawing Sheets

GRAPHICALLY DISPLAYING MANUFACTURING EXECUTION SYSTEM INFORMATION DATA ELEMENTS ACCORDING TO A PRE-DEFINED SPATIAL POSITIONING SCHEME

CROSS-REFERENCE TO RELATED APPLICATION

This application claims the priority benefit of Weinrich et al., U.S. Provisional Patent Application Ser. No. 61/178,891, filed on May 15, 2009, entitled "GRAPHICALLY DISPLAYING MANUFACTURING EXECUTION SYSTEM INFORMATION DATA ELEMENTS ACCORDING TO A PRE-DEFINED SPATIAL POSITIONING SCHEME," the contents of which are expressly incorporated herein by reference in their entirety, including any references therein.

TECHNICAL FIELD

The present invention generally relates to the field of networked computerized systems utilized to monitor, log, and display relevant manufacturing/production events and associated data. More particularly, the present invention relates to supervisory control and data acquisition (SCADA) and/or manufacturing execution systems (MES). Such systems generally execute above/outside of a control layer of a manufacturing/process control system to record production events and related event data and to provide guidance to lower level control elements such as, by way of example, programmable logic controllers.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. An example of such system is the well-known Wonderware INTOUCH® human-machine interface (HMI) software system for visualizing and controlling a wide variety of industrial processes. An INTOUCH HMI process visualization application includes a set of graphical views of a particular process. Each view, in turn, comprises one or more graphical elements. The graphical elements are "animated" in the sense that their display state changes over time in response to associated/linked data sources. For example, a view of a refining process potentially includes a tank graphical element. The tank graphical element has a visual indicator showing the level of a liquid contained within the tank, and the level indicator of the graphical element rises and falls in response to a stream of data supplied by a tank level sensor indicative of the liquid level within the tank. Animated graphical images driven by constantly changing process data values within data streams, of which the tank level indicator is only one example, are considerably easier for a human observer to comprehend than a stream of numbers. For this reason process visualization systems, such as INTOUCH, have become essential components of supervisory process control and manufacturing information systems.

An exemplary environment within which supervisory control and data acquisition (SCADA) and manufacturing execution system (MES) are potentially implemented is described, for example in Krajewski, III, et al. U.S. application Ser. No. 10/943,301 which corresponds to US App. Pub. 2006/0056285 A1, the contents of which are incorporated herein by reference in their entirety, including any references contained therein. The MES is, by way of example, the FACTELLIGENCE MES product of Invensys, Systems, Inc. The MES differs from the SCADA component in that it is not generally used to exert supervisory control over a plant/manufacturing process. Instead, the MES monitors production and records various production/manufacturing events and applies known business rules to render decisions governing production operations carried out by the SCADA system. MES systems interface to higher level enterprise resource planning (ERP) systems.

SUMMARY OF THE INVENTION

The disclosed system and methods address a potential need to provide better ways of displaying the data contained within a supervisory process control and/or production databases. In particular, the system and method described herein incorporate a generic display engine platform for creating visual displays containing provided data elements. The spatial positioning of graphical objects (corresponding to data elements) on a display space is governed by a configurable set of pre-defined rules applied by the generic display engine platform.

The described system and the method steps carried out by the disclosed system are generally embodied in computer-executable instructions stored on a physical computer readable medium.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
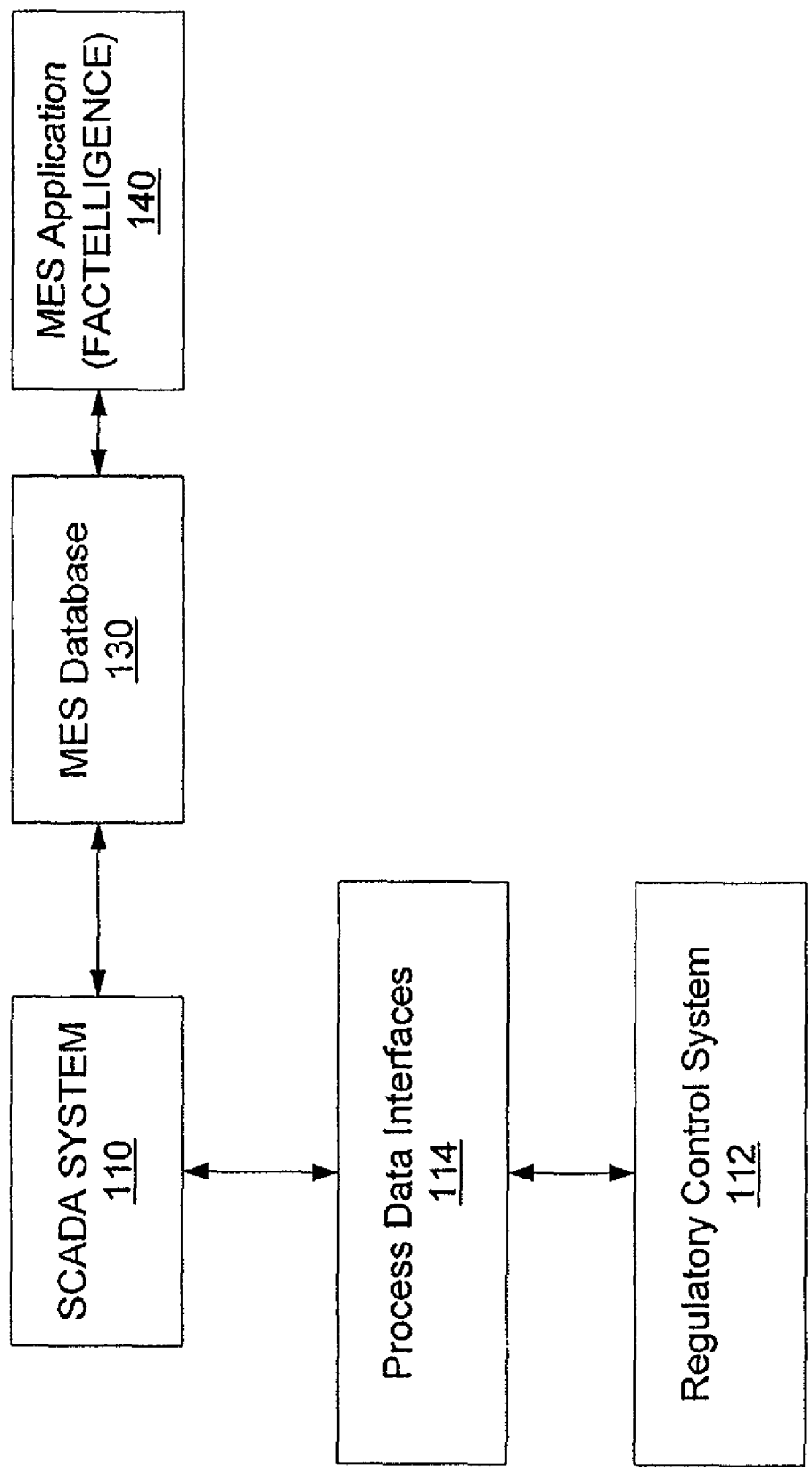
FIG. 1 is a schematic diagram depicting an exemplary computer system/network environment including both SCADA and MES components.

An exemplary SCADA/MES environment is depicted in FIG. 1 that incorporates the Invensys ARCHESTRA® operating environment wherein application objects are hosted by application engines, and the application engines are hosted by platforms in a multi-level hosting arrangement. Such environment is disclosed, by way of example, in Krajewski, III, et al. U.S. application Ser. No. 10/943,301 which corresponds to US App. Pub. 2006/0056285 A1, and Resnick et al. U.S. application Ser. No. 10/179,668, filed on Jun. 24, 2002, the contents of each application are incorporated herein by reference in their entirety, including any references contained therein.

The exemplary SCADA/MES environment schematically depicted in FIG. 1 comprises a SCADA portion 110 and an MES database 130. Runtime process data generated by a regulatory control system 112 is received by the SCADA portion 110 through any combination of process data interfaces 114. As those skilled in the art will readily appreciate, the source of the process data is generally sensor data provided by field devices to regulatory control processors (via a variety of interfaces). The process data thereafter passes from the regulatory control system 112 to the SCADA portion 110 via any of a variety of communications channels including gateways, integrators, and runtime process data storage applications (e.g., plant Historian database).

An MES application 140, such as INVENSYS SYSTEMS, INC. FACTELLIGENCE MES application, running on a plant monitoring application node in the SCADA/MES environment schematically depicted in FIG. 1, provides a series of views driven by the production/utilization information contained within the configured entities (elements) within the MES database 130. MES applications software systems provide a configurable facility for tracking the status (and thus utilization and availability) of plant equipment. Thus, instead of controlling the operation of plant equipment (the domain of SCADA systems), MES applications capture and provide real-time, instantaneous plant/production information relating to the operational status of equipment within manufacturing process chains. MES applications thus facilitate tracking equipment utilization and improving/optimizing plant equipment utilization through efficient use of the plant equipment.

Introduction

The general design for a relationship view control (RVC) associated with the MES application 140 is described herein below. It is important to understand that though the relationship view control is being described with reference to the MES application 140, the relationship view control can be incorporated into a variety of data element display applications where relationships can be readily determined between different types of data elements. Therefore the relationship view control described herein is based upon a generalized platform that it is independent of the data source/element types and data element type relationships to be graphically displayed.

Glossary

Element—An item rendered in the RVC. An element's visual appearance is defined by its data template, and the information it contains is defined by its Item Source. An Element type refers to the type of the Element displayed.

Current Element—The element that is the focal element in the RVC.

Selected Element—The element that currently has focus in the RVC.

Element Template—Defines the UI layout and binding paths for an Element type rendered in the RVC.

Relationship—The definition between an Element type and the Current Element.

Relationship View—A collection of Relationships as they pertain to a Current Element type.

Relationship Model—The rendered relationship between the Current Element and each of its related Element type instances.

System Overview

Figure 2:
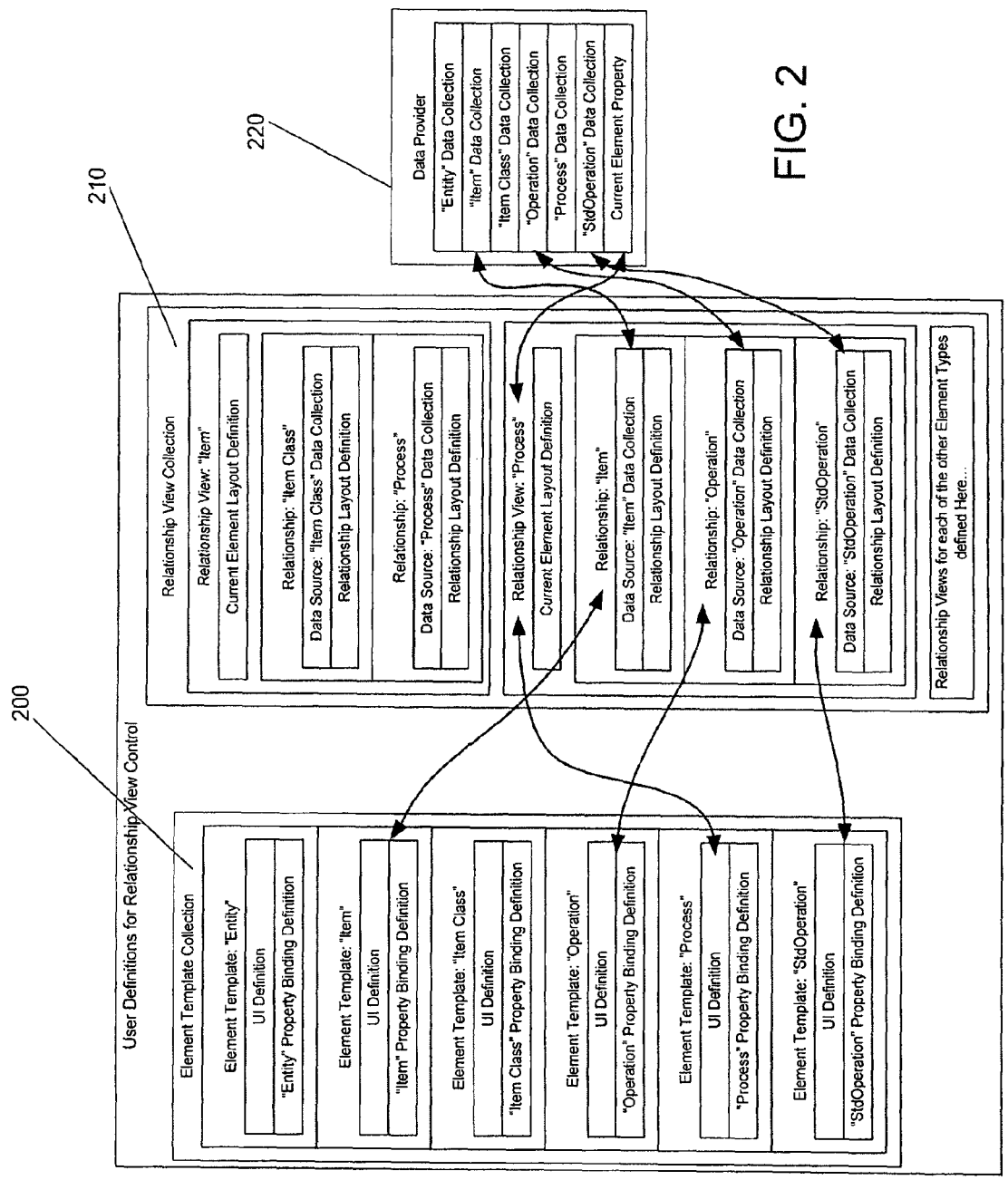
FIG. 2 illustratively depicts a set of structures defining data element templates and their relationship views for a set of data elements supplied by a data provider.

The RVC renders a set of graphical objects, corresponding to data elements, presented on a display including graphical depictions of the relationships between the data elements. Moreover, the RVC enables a user to navigate the displayed data elements contained in the displays in accordance with their relationships. The RVC renders the displays of data elements based on: (1) user defined relationships, (2) a user interface layout (rules/template), and (3) data providers. The exemplary embodiment is described with reference to the following functional components:

Relationship View Control
Layout Characteristics
Control Properties
Rendering Notes
Navigation Element and View Definitions and Data Turning to FIG. 2, a set of structures defining data element templates and their relationship views are illustratively depicted for a set of data elements supplied by a data provider to the RVC. FIG. 2 shows how definitions for the RVC (an Element Template Collection 200 and a Relationship View Collection 210) relate to each other and to a supplied Data Provider 220. Regarding the Element template collection 200, an Element Template is provided for each Element type (e.g., Entity, Item, Item Class, Operation, Process, and StdOperation) to be displayed by the RVC. For each Element Type that can be displayed as a Current Element, a Relationship View is defined that contains relationship definitions for each of the other potentially related Element Types. Each Element Type defined in a Relationship has a corresponding Data Collection in the supplied Data Provider 220.

Relationship View Layout Operation

Figure 3:
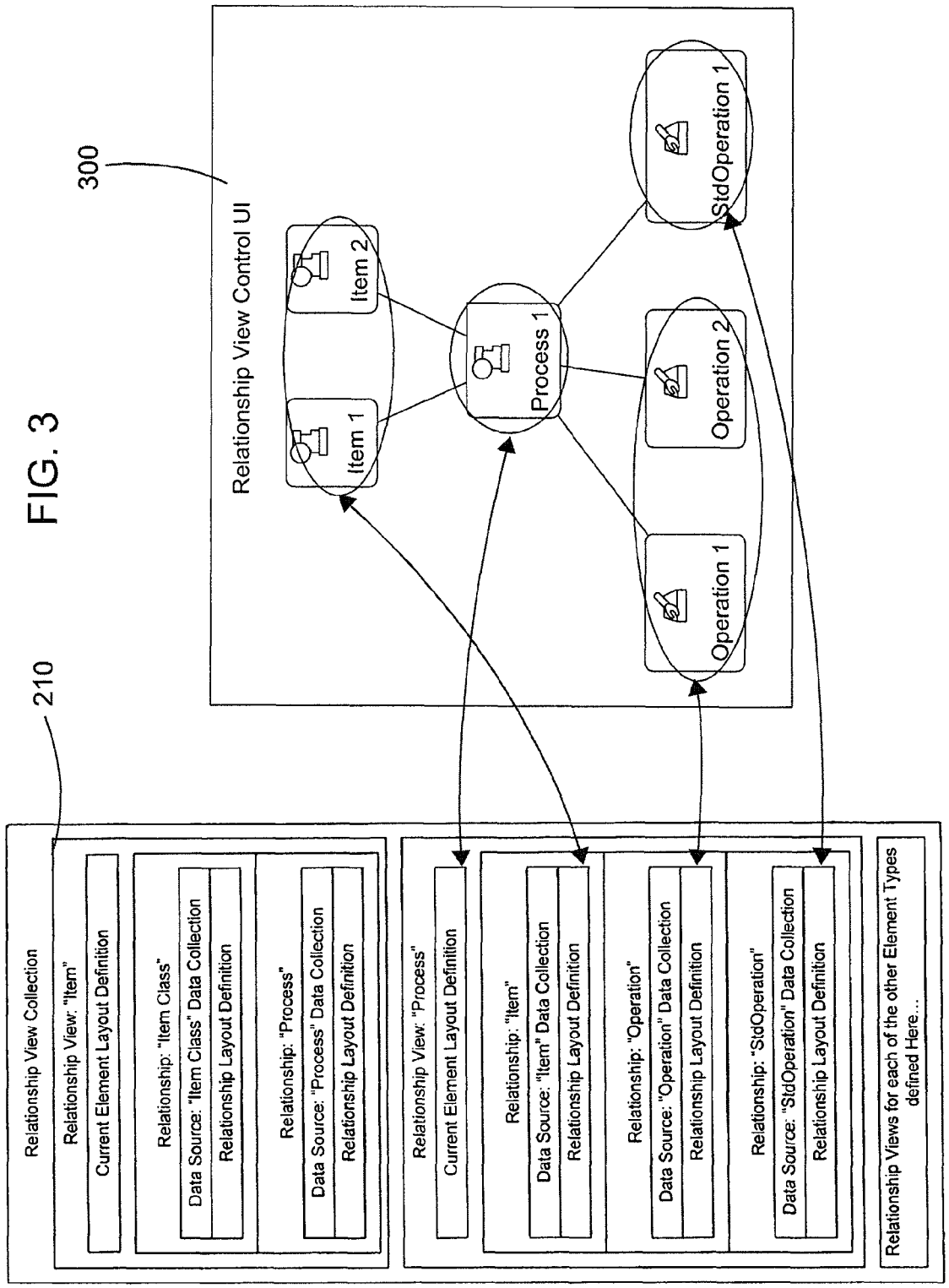
FIG. 3 illustratively depicts an overall Relationship View layout based on a Relationship View Collection definition.

Turning to FIG. 3, an overall Relationship View layout 300 is depicted that is based on the Relationship View Collection 210 definition. Relationships between the displayed elements and the relationship view definitions within the Relationship View Collection 210 are shown in the arrows.

In the illustrative example, the Current Element is a "Process" element (Process 1). The RVC uses a Current Element Layout Definition for a "Process" within the Relationship View Collection 210 to determine its location on the RVC layout 300 (canvas). In the illustrative example, a "Process" contains three Relationship View relations: (1) Item, (2) Operations, and (3) StdOperation. Each defined Relationship View relation defined for a "Process" element type contains: (1) a Relationship Layout Definition which specifies how the Relationship should be rendered relative to the Current Element, and (2) a Data Source Data Collection that specifies a line used to connect the two data element types (e.g., Process and Item, Process and Operation, and Process and StdOperation). In the illustrative example, the Process/Item Relationship specifies displaying an Item type element above the Process element when the focus is on the Process element. The line type for showing the Item/Process connection is, for example, a gray line. Similarly, Operation and StdOperation (to Process) Relationships are defined within the Relationship View Collection 210 to be displayed below the Process Element (when the Process Element is the Current Element). The connection between the Process element and the Operation and StdOperation elements is depicted using an orange line.

Element Template UI Definitions

Figure 4:
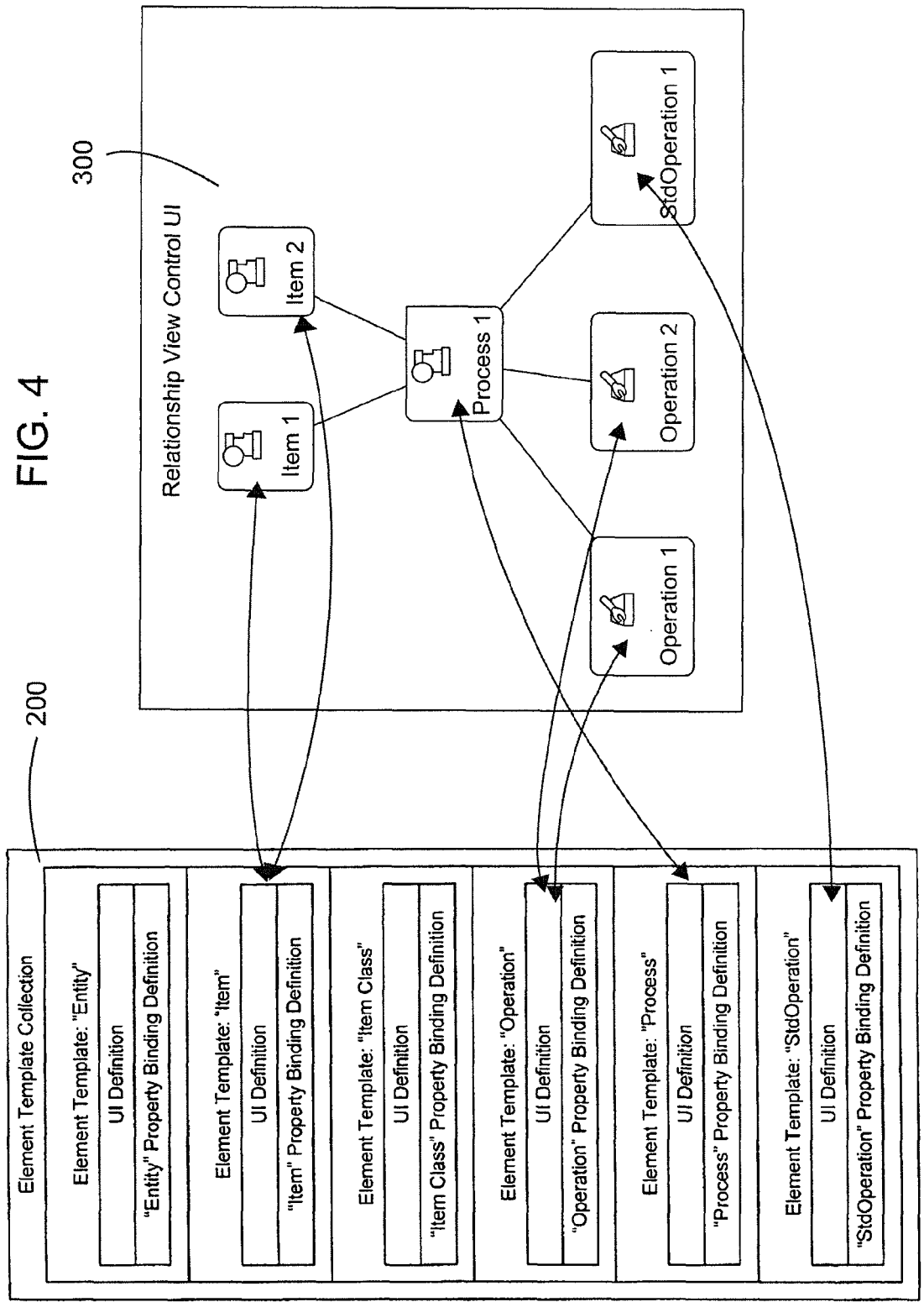
FIG. 4 illustratively depicts functionality of the Element Template Collection to provide graphical UI definitions for each individual data element displayed in the overall Relationship View layout.

FIG. 4 illustratively depicts the functionality of the Element Template Collection 200 to provide graphical UI definitions (faceplates) for each individual data element displayed in the overall Relationship View layout 300. The RVC determines an element type of each data element to be rendered on the layout 300. Thereafter, the RVC finds the UI definition in the Element Template Collection 200. The UI definition specifies a base description (independent of the actual data values for a data element) of the appearance of a particular type of data element when displayed within the layout 300. In the illustrative example, the Process Element Template defines a corresponding generic UI for a Process data element such that the graphical rendering for a particular process element instance includes, for example: rounded corners, a white background, an image within the white background representing the instance, and displays the name of the process data element instance below the image.

Element Instance Data

Figure 5:
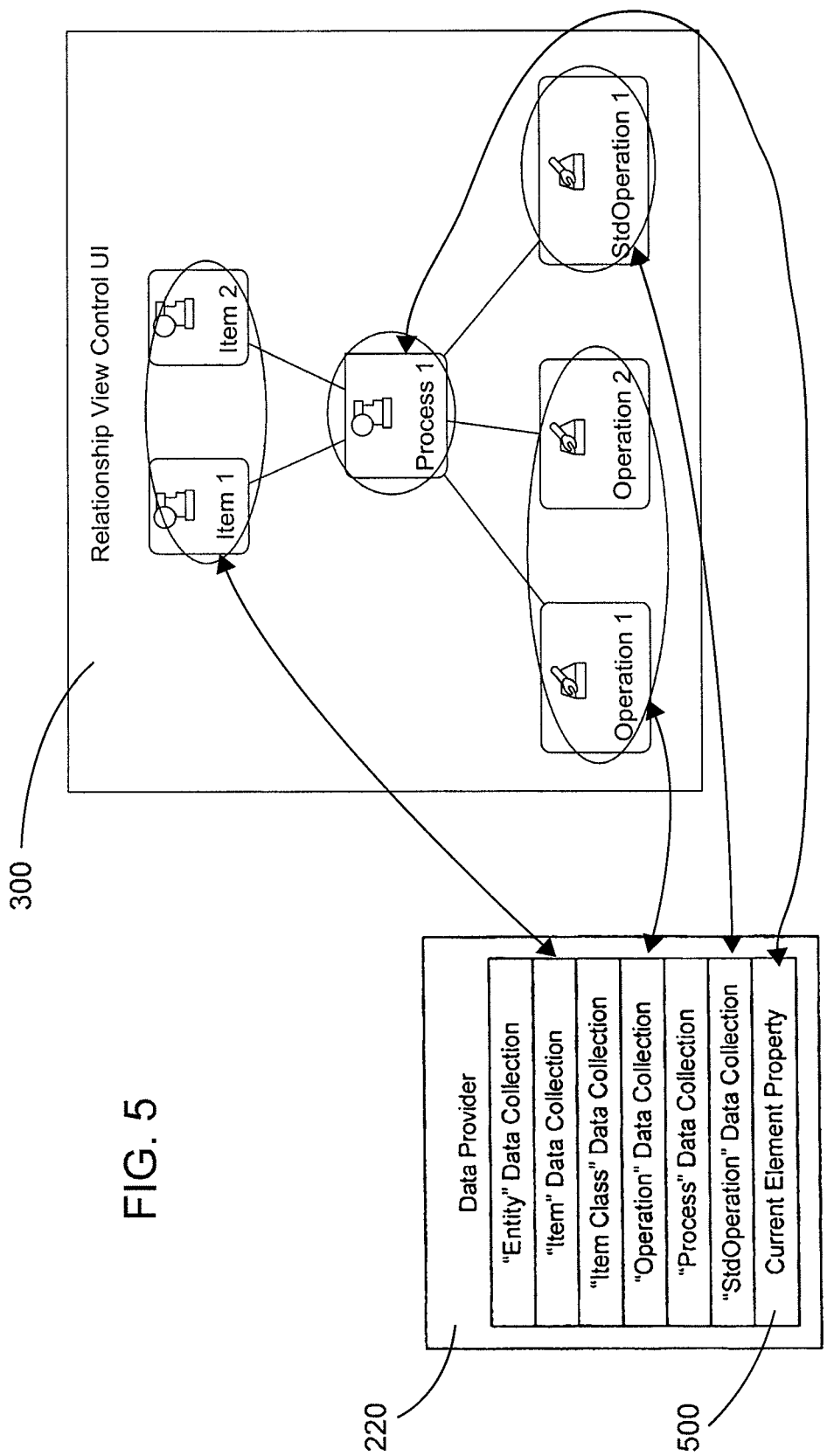
FIG. 5 illustratively depicts functional relationships between the RVC's rendering of the overall Relationship View layout and particular data element instance information that is used to complete the UI for each of the data elements represented in the layout.

FIG. 5 illustratively depicts the functional relationships between the RVC's rendering of the overall Relationship View layout 300 and particular data element instance information that is used to complete the UI for each of the data elements represented in the layout 300. In the illustrative example, the Data Provider 220 (set of data element instances) specifies a Current Element property 500 to a data element instance. The data supplied in the element instance is an image that represents the current element instance and the name of the instance (Process 1). Based on the related data elements defined in the Data Provider 220, the RVC retrieves the information for the Item, Operation, and StdOperation data element instances from their respective collections in the Data Provider 220. In the illustrative example, the "Item" data collection contains two instances "Item 1" and "Item 2", the "Operation" data collection contains two instances "Operation 1" and "Operation 2", and the "StdOperation" data collection contains only one instance "StdOperation 1." The data supplied for each data element instance in the Data Provider 220 supplements a base appearance definition provided for the particular data element type by the Element Template Collection 200 to render each Element shown in the layout 300 generated by the RVC. Furthermore, in an exemplary embodiment image data for an element is supplied by the Data Provider 220 (see, FIG. 6 described herein below).

Relationship View Control

With continued reference to the layout 300 depicted in FIG. 5, the RVC has a central focal element (i.e., "Current Element") to which all of the other elements in a particular RVC view are depicted with their associated connections. Any of the related data elements in a displayed RVC view (e.g., layout 300) can be selected by a user to make the selected data element the "Current Element." The RVC view is thereafter re-generated with the new Current Element and all related data elements.

In the example layout 500 depicted in FIG. 5, the Current Element is Process 1 and the related data elements are shown above and below the Current Element. When a user selects one of the non-Current elements, for example by single clicking on the graphical UI element corresponding to the non-Current element of interest, the selection causes the selected data element template to be used to display data associated with the selected element. The user can "navigate" to a non-Current Element in the layout 300 by, for example, double clicking on the non-Current Element. In response to the "navigate" command being registered, the selected non-Current Element is designated as the Current Element, and the RVC re-generates the layout 300 according to the new Current Element and its relationships to other data elements specified by the Data Provider 220, the Relationship View Collection 210, and the Element Template Collection 200.

Figure 6:
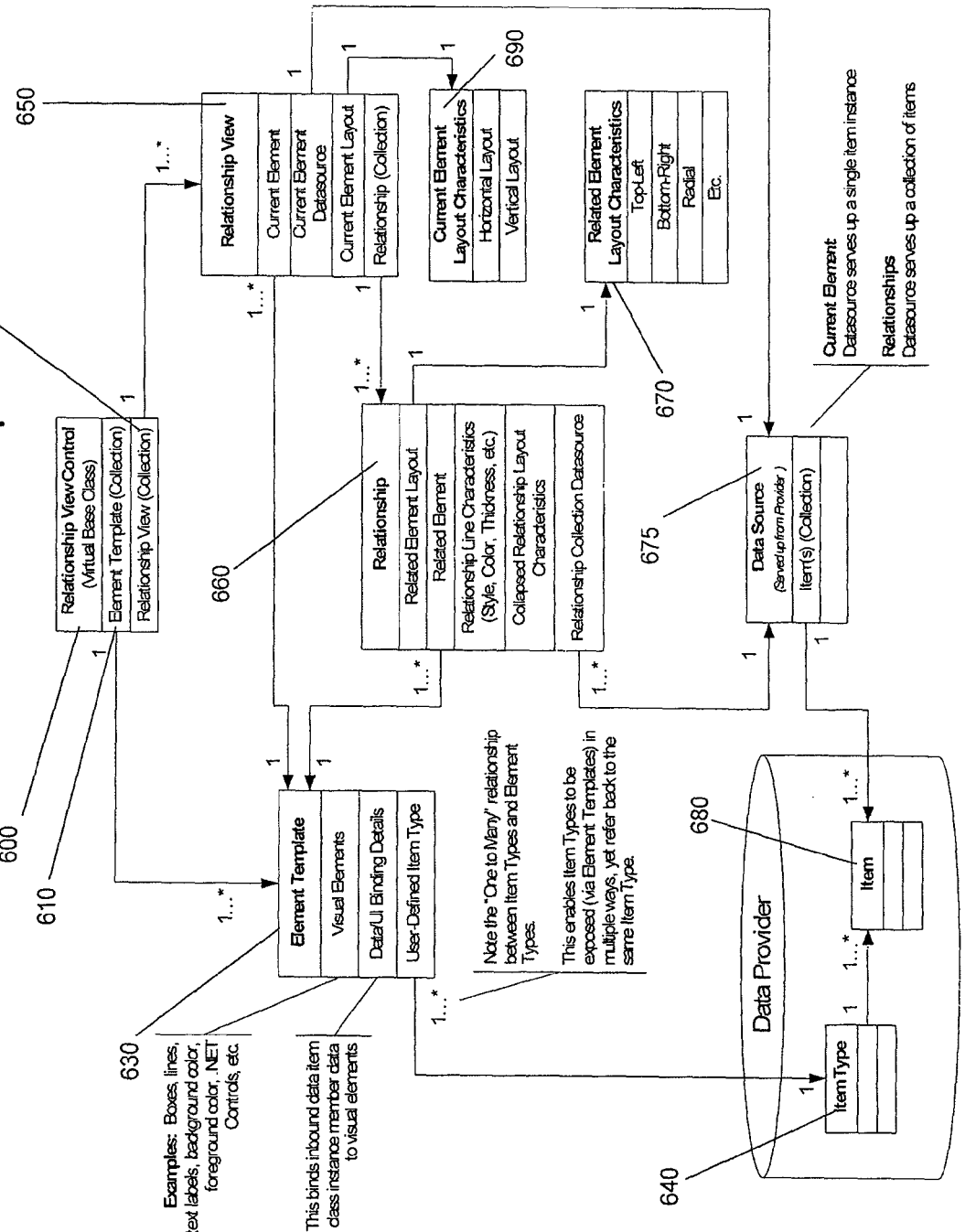
FIG. 6 depicts an exemplary class diagram for carrying out the functionality of the RVC.

Turning to FIG. 6 an exemplary class diagram is provided for carrying out the functionality of the RVC. By way of example, an RVC class object 600 includes an element template collection 610 containing one or more of the Element Template Collection 200 described herein above. The RVC class object 600 also includes a Relationship View Collection 620 containing one or more of the Relationship View Collection 210 described herein above.

Each Element Template class 630 specified in the Element Template collection 610 defines a base UI particular data element type. In the case of a user defined item type, a further customization to a particular one of the element template class 630 is specified by an item type 640 maintained by the Data Provider 220.

Each Relationship View class 650 specified in the Relationship View collection 620 defines a relationship view for a particular data element type (e.g., item, item class, process, etc.). Each relationship view class 650 includes a relationship collection specifying one or more of a relationship class 660.

Each relationship class specifies graphical characteristics (see, FIG. 6) for a particular relationship between two data element types. The relationship class 660 specifies a related element layout characteristics class 670 specifying various spatial arrangements for the particular relationship (described further herein below). The relationship class 660 also specifies a data source class 675 corresponding to the Current Element (focus of the layout). The data source class 675 in turn references actual data (item) element instance information contained in the Data Provider 220.

The relationship view class 650 also specifies a current element layout characteristics class 690 defining a horizontal and vertical layout for the particular relationship view.

Element Template Definitions

With continued reference to FIG. 6, the Element Template class 630 is defined for each of the Element types to be displayed within the RVC. The Element Template class 630 defines the UI layout for each rendered element instance. By way of example, the Element Template class 630 defines a square with rounded corners, an image, and a text label will be used to represent an Element of a particular type. The RVC uses a Template Selector to determine which Element Template to use to render a particular date element of a given type. The Template Selector determines a proper Element Template based on the specified element type. The data source object for a particular element is retrieved from the relationship class object definition for the element type defined in the relationship view. The element Template class 630 also defines bindings between visual elements and properties of the type instance the Element Template represents. For instance, the definition for a label will have the label's text bound to the "Name" property of a "Process" if the element it represents is a Process type.

Relationship View Definitions

The Relationship View class 650 object defines the Current Element type and the layout characteristics for a rendered Current Element. The Relationship View class 650 object also contains a collection of Relationships (defined by corresponding relationship class 660 objects) for a given Element type when it is displayed as the Current Element. The Relationship View class 650 object definition also contains a collection of Relationship definitions which define each of the related Element types for the Current Element type defined in the Relationship View class 650 object.

Relationship Definitions

A Relationship class 660 object defines the Element type and data source for the Element type as it is related to the Current Element in a particular Relationship View class 650 object. The Relationship class 660 object also defines the layout characteristics for the Element type, and the characteristics of the Line used to show the relationship to the Current Element. A Collapsed Element Template is provided to allow users to define a data template for the Relationship class 660 object when it is collapsed by the user in the RVC layout 300.

Relationship Data Source

The Data Source property defined in the RVC's Relationship class 660 is defined as an IEnumerable. Each item in the Data Source enumeration represents an Element related to the Current Element for the Relationship View in which the Relationship is defined.

Layout Characteristics

Having described the general functionality and components of an exemplary RVC, attention is directed to layout characteristics which define the relative positioning of related data elements within the RVC's layout view (e.g., layout 300). To determine the layout characteristics of the Current Element (position within the RVC layout) and the Related Elements (position in relation to the Current Element) the RVC uses the definitions provided by the Relationship View Collection 620 specified by a user of the RVC.

Current Element Layout

Figure 7:
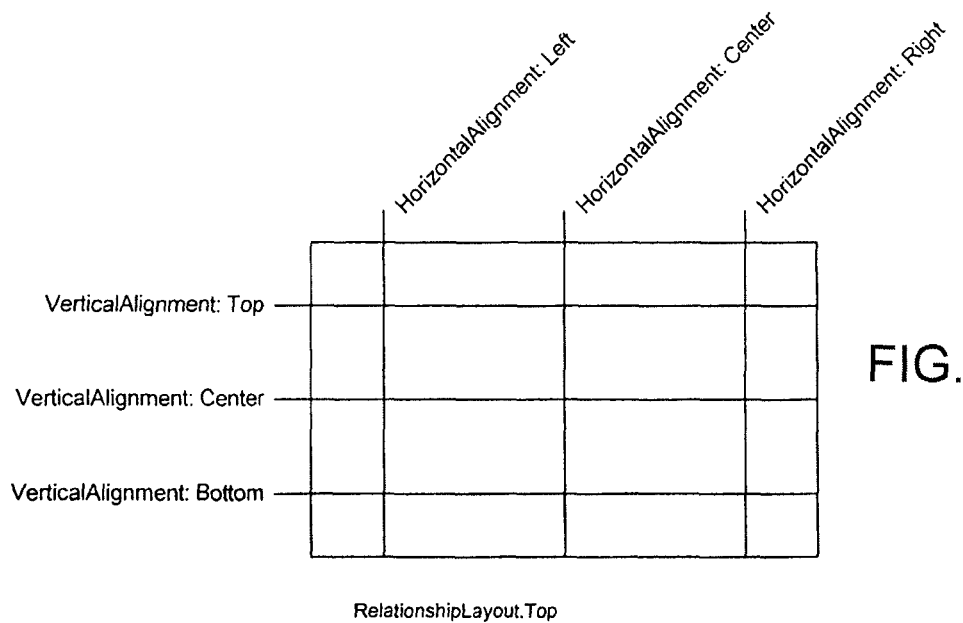
FIG. 7 illustratively depicts Current Element layout characteristics defined by the Horizontal and Vertical Alignment enumerations.
Figure 8:
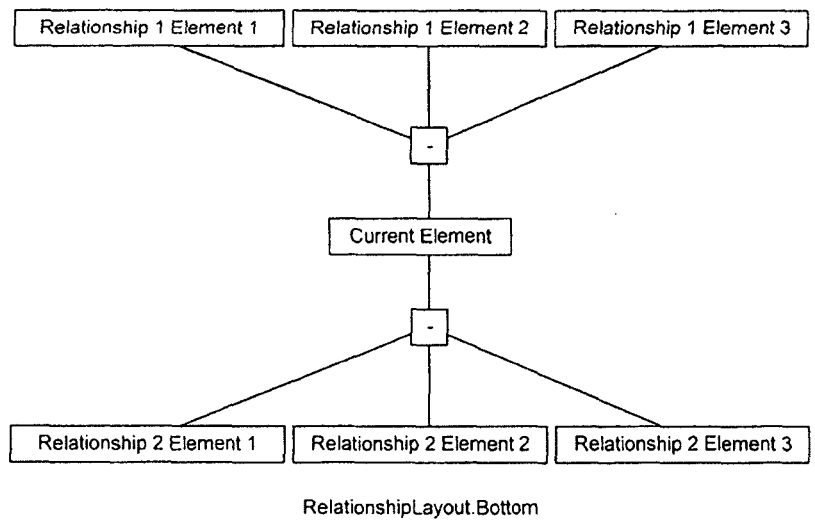
FIGS. 8, 9, 10, and 11 illustratively depict various examples of supported spatial relationships between a current element and a related element.
Figure 9:
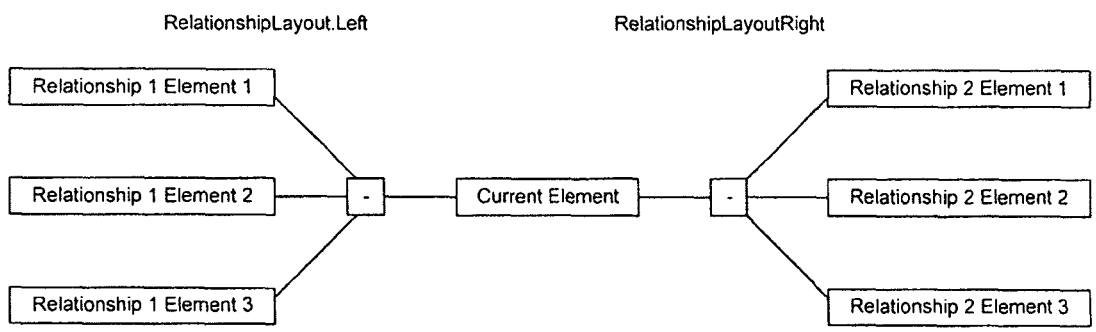
Figure 10:
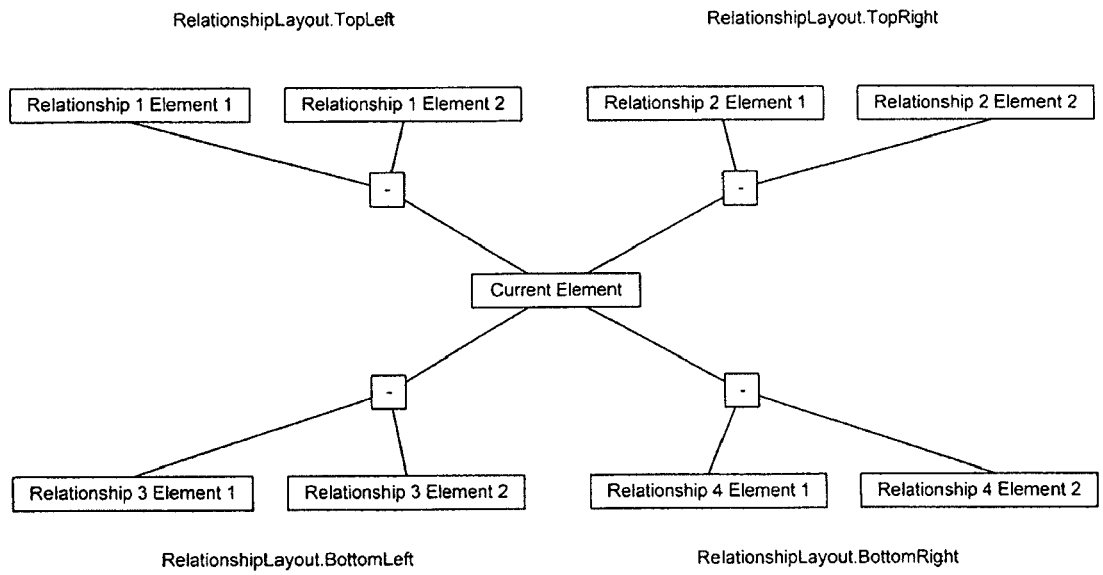
Figure 11:
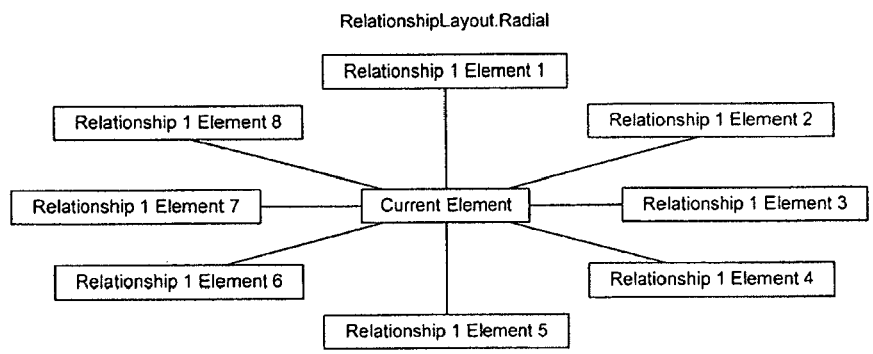

The Current Element Layout characteristics are defined using Horizontal Alignment and Vertical Alignment enumerations. The alignment definitions are used together to define the general placement of the Current Element in the RVC canvas. The diagram provided in FIG. 7 illustrates the Current Element layout characteristics defined by the Horizontal and Vertical Alignment enumerations.

Related Element Layout

The Related Element Layout characteristics of the Relationship class 660 objects define the placement of a related element of a given type relative to the current element. All elements meeting the Relationship class 660 object definition are rendered according to the corresponding Related Element Layout 670 definition. The RelationshipLayout enumeration defines this relative layout. The diagrams depicted in FIGS. 8, 9, 10 and 11 illustrate various examples of layout position relationships between a current element and a related element.

Control Properties and Events

Figure 12:
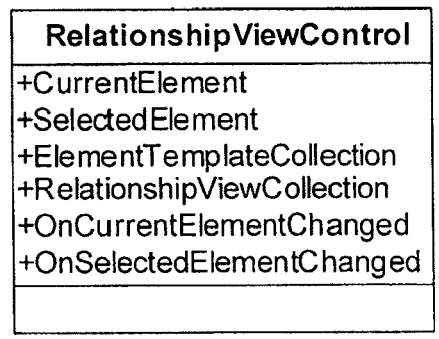
FIG. 12 identifies a set of custom dependency properties and events exposed by the RVC.

FIG. 12 identifies a set of custom dependency properties and events exposed by the RVC.

CurrentElement: The CurrentElement Dependency Property is a Read/Write property and is set by an RVC host. When a user chooses a new Current Element the RVC host responds by updating the data sources defined for the Current Element type defined in the Relationship View.

OnCurrentElementChanged: The OnCurrentElementChanged event is fired by the RVC whenever the user chooses a new Current Element. The event value is the object used as the data source item for the Current Element.

SelectedElement: The SelectedElement Dependency Property is read by the RVC host and reflects the element that currently has focus within the RVC.

OnSelectedElementChanged: The OnSelectedElementChanged event is fired by the RVC whenever the user selects an Element in the RVC. The event value is the object used as the data source item for the selected element.

OnElementDropped: The RVC provides drag and drop functionality as a drop target. When an object is dropped onto the RVC canvas the RVC determines whether the object dropped is a valid type, and if the object is a valid type then a drop event is fired. The event parameters contain a reference to the dropped object. The OnElementDropped property allows the host to provide the user with droppable objects (such as elements in a toolbox) which can be dropped onto the relationship model and create new relationships. Each defined Relationship view contains information about whether the Relationship view can act as a drop target, and which Element object types can be dropped on the object within the RVC.

To determine whether an object is droppable, the RVC compares the type of the object being dropped to the types defined in the Relationship View. If the type is defined within the Relationship View then the object being dropped is considered to be a valid droppable object.

Rendering a Layout (e.g., Layout 300)

As mentioned above, the Elements of a Relationship will be positioned, in relation to the Current Element, according to the RelationshipLayout value configured in the Relationship definition. With the exception of the radial layout, the Elements of each group are rendered together so the group as a whole may be collapsed or expanded. Therefore, Elements in the Relationship are distinguished as the specific element type, rather than multiple types mixed together. If multiple Relationships share the same RelationshipLayout value in the same Relationship View, they are rendered adjacent to each other according to the order in which the element types are defined in a Relationship View.

When a Relationship is collapsed, the Relationship's collapsed element is displayed.

When the radial layout is specified, each Relationship (defined with this layout type) is rendered in concentric rings around the Current Element. The inner most relationship is that which is defined first in the Relationship View.

Navigation

The disclosed system supports users navigating through the Elements in the RVC by double clicking an Element on the layout (e.g., layout 300). The double-clicked Element becomes the Current Element. The RVC, in accordance with the newly designated Current Element, renders a new layout defined by the new Current Element's Relationship View definition. This navigation functionality enables users to drill through displayed relationships displayed without having to fully understand the overall data model of the set of data elements contained in the Data Provider 220.

The navigation functionality allows a user to not have to understand how multiple disparate Element instances are related in terms of their data storage relationships, yet the user can see those relationships, and has the potential to see other relationships to the same Element instance based on different Relationship Views of the same Element type. For example, an Item may have a Relationship View defined for configuration type relationships and another for runtime type relationships. The user navigates through the Item configuration view and the host provides a way to switch the view to the Item runtime view. This gives the user the power to see both types of relationships for the Element instance, and drill through those relationships to find needed information.

Operation of the RVC

Figure 13:
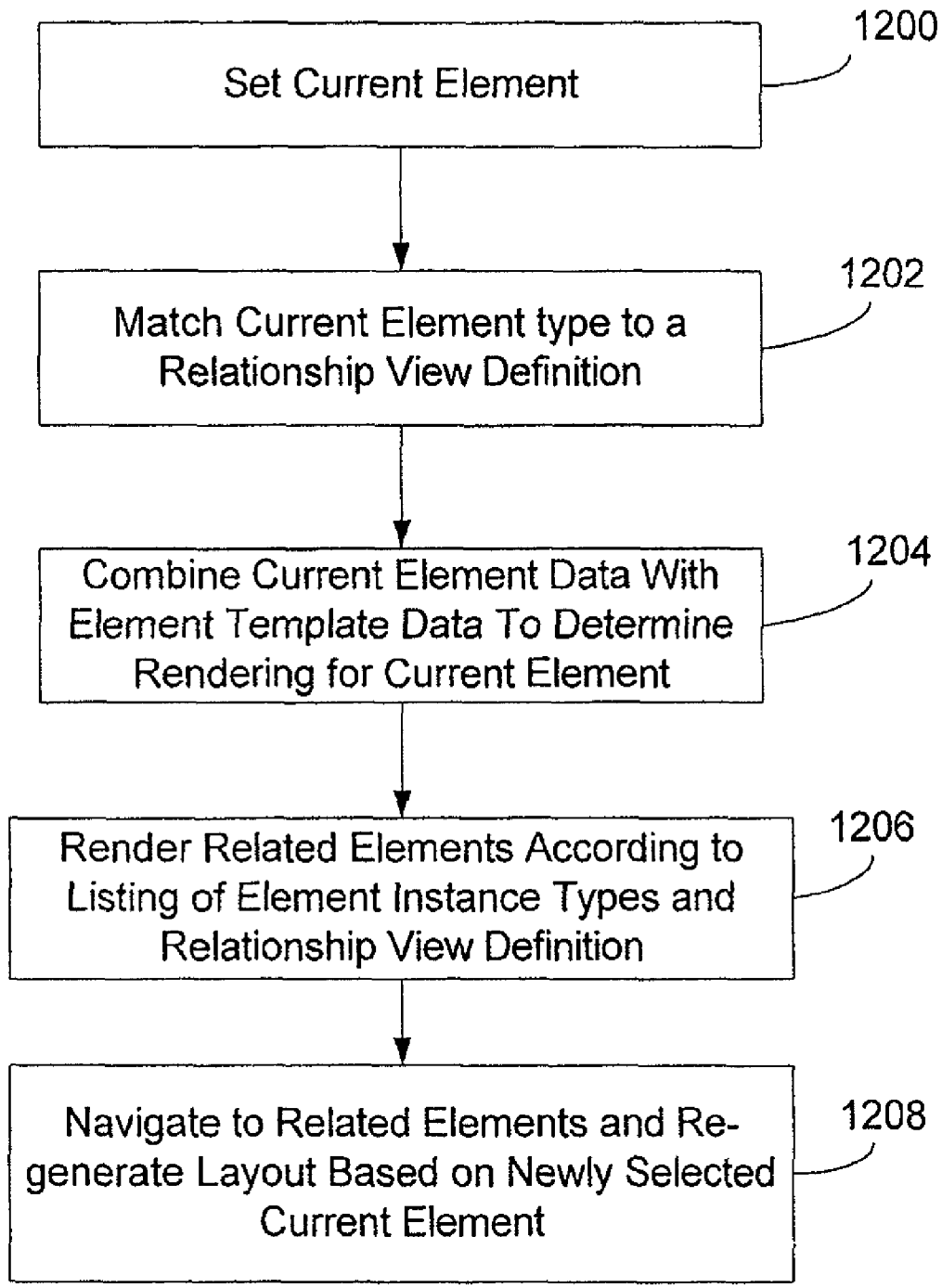
FIG. 13 is a flowchart summarizing the general operation of the RVC to generate an initial layout for related data elements and thereafter support navigation of data elements supplied by a data provider for display in accordance with a defined Element Template Collection and Relationship View Collection of the RVC.

Turning to FIG. 13, the operation of the RVC described, by way of example, herein starts with a host of the RVC setting the Current Element value during step 1200. In response, during step 1202 the RVC matches the Current Element value's type with the Relationship Views defined for the instance of the RVC. Once the Relationship View definition is found, during step 1204 the RVC combines the object data for the Current Element with the Element Template defined for that type to determine how the Current Element should be rendered in the RVC.

Next, during step 1206 the RVC iterates through each relationship defined in the Relationship View. For each relationship between the Current Element and a related element instance the RVC uses the Element Template definition for the type defined in the Relationship to render each of the related element instances needed to represent the data in the data source for the Element Type.

The layout characteristics defined for the Current Element and for each Relationship are used to determine the layout (e.g., layout 300) of the Relationship Model. During step 1208, the user interacts with the model by double clicking on displayed related data elements to navigate through the various connected/related data Element instances within the displayed relationship model. Each time the user navigates to a new Element, a new Current Element value is set, and the data sources for the related types are updated to reflect the Element instances related to the new Current Element.

Relationship View Control Data Structures

Introduction

This portion of the disclosure maps a prototype source for the Relationship View Control (RVC) to the concepts defined in the Relationship View Control Class Structures and Relationships diagram.

Overview

The prototype includes one Relationship View definition and it was set up so there is a Current Element, and that Current Element could have two relationships: Superiors and Subordinates. In the prototype there is no Relationship class but the concept of Relationship Classes is demonstrated by the Superior and Subordinate definitions. For instance, a Relationship class in the Relationship View Control Class Structures and Relationships diagram is defined as having an Element Template, Related Element Type, Line Characteristics, Layout Characteristics, and DataSource. These are represented in the prototype code (and data structures below) in the following way:

| Relationship Class Diagram Name | Prototype Equivalent |
|---|---|
| Element Template | SuperiorElementTemplate and SubordinateElementTemplate properties |
| Related Element Type | Since there's no collection the act of naming it Superior or Subordinate takes care of this |
| Line Characteristics | SuperiorLineBrush and SubordinateLineBrush properties |
| Layout Characteristics | ModelLayouttype definition |
| Data source | SuperiorElementsSource and SubordinateElementsSource properties |

The source is split between C# source and XAML definitions. In the prototype the data provider contains a Current Element data source, and Superiors and Subordinates data sources. The information will be presented in the following order:

Relationship View Control Data Structures

Data Structures defined in C#

Data Structures defined in XAML

Data Source Data Structures

Relationship View Control Classes Defined in C#

The following code snippets show the prototype class definitions and how they relate to the overall Relationship View Control design.

This Enum Conceptually Represents the Layout Characteristics of the Relationship View In the prototype the only layout characteristic is the related data elements in relation to the current elements in either a horizontal or vertical layout.

```
#region ModelLayoutType Definition
public enum ModelLayoutType
{
    TopToBottom,
    LeftToRight
}
#endregion
```

This Class Conceptually Represents the Relationship View Class

In the prototype code there is essentially just one Relationship View which is defined encapsulated in the User Control its self.

```
/// <summary>
/// Interaction logic for RelationshipViewerControl.xaml
/// </summary>
public partial class RelationshipViewerControl : UserControl
{
    #region Data Members
    RelationshipDrawingExecution _superiorElementsDraw;
    RelationshipDrawingExecution _subordinateElementsDraw;
    RelatedElementControl _currentElement = null;
    RelatedElementControl _selectedElement= null;
    bool _modelCanvasInitialized = false;
    #endregion
    #region Constructor
    public RelationshipViewerControl( )
    {
        InitializeComponent( );
        #region Setup Default DataTemplate Values
        DataTemplate defaultElementTemplate = Resources["defaultElementTemplate_RVC"] as DataTemplate;
        SetValue(CurrentElementTemplateProperty, defaultElementTemplate);
        SetValue(SelectedElementTemplateProperty, defaultElementTemplate);
        SetValue(SuperiorElementTemplateProperty, defaultElementTemplate);
        SetValue(SubordinateElementTemplateProperty, defaultElementTemplate);
        SetValue(SiblingElementTemplateProperty, defaultElementTemplate);
        DataTemplate defaultEmptyModelTemplate = Resources["defaultEmptyModelTemplate_RVC"] as DataTemplate;
        SetValue(EmptyModelTemplateProperty, defaultEmptyModelTemplate);
        #endregion
        #region Add RelatedElementControl Event Handlers
        this.AddHandler(RelatedElementControl.MouseLeftButtonDownEvent, new MouseButtonEventHandler(REC_LeftButtonDown));
        this.AddHandler(RelatedElementControl.MouseDoubleClickEvent, new MouseButtonEventHandler(REC_DoubleClick));
        #endregion
        #region Initialize Drawing Execution Class Instances
        _superiorElementsDraw = new RelationshipDrawingExecution(GetValue(SuperiorLineBrushProperty) as Brush);
        _subordinateElementsDraw = new RelationshipDrawingExecution(GetValue(SubordinateLineBrushProperty) as Brush);
        #endregion
    }
    #endregion
```

This Property is Used to Set the Superior Elements Relationship Collection Datasource

```
#region SuperiorElementsSource Property
public static readonly DependencyProperty SuperiorElementsSourceProperty = DependencyProperty.Register(
    "SuperiorElementsSource",
    typeof(System.Collections.IEnumerable),
    typeof(RelationshipViewerControl)
);
public System.Collections.IEnumerable SuperiorElementsSource
{
    get { return (System.Collections.IEnumerable)GetValue(SuperiorElementsSourceProperty); }
    set { SetValue(SuperiorElementsSourceProperty, value); }
}
private static void OnSuperiorElementsSourceChanged(DependencyObject o, DependencyPropertyChangedEventArgs e)
{
    ((RelationshipViewerControl)o).HandleSubordinateElementsSourceChanged(e);
}
private void HandleSuperiorElementsSourceChanged(DependencyPropertyChangedEventArgs e)
{
    if (e.NewValue == null)
        return;
    if (e.NewValue is System.Collections.IEnumerable)
    {
        UpdateModelUI( );
    }
}
#endregion
```

This Property is Used to Set the Subordinate Elements Relationship Collection Datasource

```
#region SubordinateElementsSource Property
public static readonly DependencyProperty SubordinateElementsSourceProperty = DependencyProperty.Register(
    "SubordinateElementsSource",
    typeof(System.Collections.IEnumerable),
    typeof(RelationshipViewerControl)
);
public System.Collections.IEnumerable SubordinateElementsSource
{
    get { return
```

```
(System.Collections.IEnumerable)GetValue(SubordinateElementsSourceProperty); }
        set { SetValue(SuperiorElementsSourceProperty, value); }
    }
    private static void OnSubordinateElementsSourceChanged(DependencyObject o,
DependencyPropertyChangedEventArgs e)
    {
        ((RelationshipViewerControl)o).HandleSubordinateElementsSourceChanged(e);
    }
    private void HandleSubordinateElementsSourceChanged(DependencyPropertyChangedEventArgs
e)
    {
      if (e.NewValue == null)
         return;
      if (e.NewValue is System.Collections.IEnumerable)
      {
         UpdateModelUI( );
      }
    }
    #endregion
```

This Property is Used to Set the Element Template for the Current Element

```
    #region CurrentElementTemplate Property
    public static readonly DependencyProperty CurrentElement-
TemplateProperty = DependencyProperty.Register(
        "CurrentElementTemplate",
        typeof(DataTemplate),
        typeof(RelationshipViewerControl),
        new FrameworkPropertyMetadata(new DataTemplate( ), new
PropertyChangedCallback(OnCurrentElementTemplateChanged))
    );
    public DataTemplate CurrentElementTemplate
    {
      get { return (DataTemplate)GetValue(CurrentElementTemplate-
         Property); }
      set { SetValue(CurrentElementTemplateProperty, value); }
    }
    private static void OnCurrentElementTemplateChanged-
```

```
(DependencyObject o, DependencyPropertyChangedEventArgs e)
    {
        ((RelationshipViewerControl)o).HandleCurrentElement-
          TemplateChanged(e);
    }
    private void HandleCurrentElementTemplateChanged(Dependency-
PropertyChangedEventArgs e)
    {
      if (e.NewValue is DataTemplate)
      {
         UpdateModelUI( );
      }
    }
    #endregion
```

This Property is Used to Set the Element Template for the Superior Element Relationship

```
    #region SuperiorElementTemplate Property
    public static readonly DependencyProperty SuperiorElementTemplateProperty =
DependencyProperty.Register(
        "SuperiorElementTemplate",
        typeof(DataTemplate),
        typeof(RelationshipViewerControl),
        new FrameworkPropertyMetadata(new DataTemplate( ), new
PropertyChangedCallback(OnSuperiorElementTemplateChanged))
    );
    public DataTemplate SuperiorElementTemplate
    {
      get { return (DataTemplate)GetValue(SuperiorElementTemplateProperty); }
      set { SetValue(SuperiorElementTemplateProperty, value); }
    }
    private static void OnSuperiorElementTemplateChanged(DependencyObject o,
DependencyPropertyChangedEventArgs e)
    {
        ((RelationshipViewerControl)o).HandleSuperiorElementTemplateChanged(e);
    }
    private void HandleSuperiorElementTemplateChanged(DependencyPropertyChangedEventArgs e)
    {
      if (e.NewValue is DataTemplate)
      {
         UpdateModelUI( );
      }
    }
    #endregion
```

This Property is Used to Set the Element Template for the Subordinate Element Relationship

```
#region SubordinateElementTemplate Property
public static readonly DependencyProperty SubordinateElementTemplateProperty =
DependencyProperty.Register(
    "SubordinateElementTemplate",
    typeof(DataTemplate),
    typeof(RelationshipViewerControl),
    new FrameworkPropertyMetadata(new DataTemplate( ), new
PropertyChangedCallback(OnSubordinateElementTemplateChanged))
);
public DataTemplate SubordinateElementTemplate
{
    get { return (DataTemplate)GetValue(SubordinateElementTemplateProperty); }
    set { SetValue(SubordinateElementTemplateProperty, value); }
}
private static void OnSubordinateElementTemplateChanged(DependencyObject o,
DependencyPropertyChangedEventArgs e)
{
    ((RelationshipViewerControl)o).HandleSubordinateElementTemplateChanged(e);
}
private void HandleSubordinateElementTemplateChanged(DependencyPropertyChangedEventArgs e)
{
    if (e.NewValue is DataTemplate)
    {
        UpdateModelUI( );
    }
}
#endregion
```

This Property is Used to Set the Current Element Datasource

```
#region CurrentElement Property
public static readonly DependencyProperty CurrentElementProperty =
DependencyProperty.Register(
    "CurrentElement",
    typeof(object),
    typeof(RelationshipViewerControl),
    new FrameworkPropertyMetadata(null, new
PropertyChangedCallback(OnCurrentElementChanged))
);
public event DependencyPropertyChangedEventHandler CurrentElementChanged;
public object CurrentElement
{
    get { return GetValue(CurrentElementProperty); }
    set { SetValue(CurrentElementProperty, value); }
}
private static void OnCurrentElementChanged(DependencyObject o,
DependencyPropertyChangedEventArgs e)
{
    ((RelationshipViewerControl)o).HandleCurrentElementChanged(e);
}
private void HandleCurrentElementChanged(DependencyPropertyChangedEventArgs e)
{
    if (e.NewValue == null)
        return;
    if (e.NewValue is object)
    {
        //_navigationHelper.Add(e.NewValue);
        UpdateModelUI( );
    }
}
#endregion
```

This Property is Used to Set the Layout Characteristics of the Relationship View
  In this prototype the options were simply to have a horizontal or vertical layout.

```
#region ModelLayout Property
public static readonly DependencyProperty ModelLayoutProperty =
```

```
DependencyProperty.Register(
    "ModelLayout",
    typeof(ModelLayoutType),
    typeof(RelationshipViewerControl),
    new FrameworkPropertyMetadata(ModelLayoutType.TopToBottom, new
PropertyChangedCallback(OnModelLayoutChanged))
);
public object ModelLayout
{
    get { return GetValue(ModelLayoutProperty); }
    set { SetValue(ModelLayoutProperty, value); }
}
private static void OnModelLayoutChanged(DependencyObject o,
DependencyPropertyChangedEventArgs e)
{
    ((RelationshipViewerControl)o).HandleModelLayoutChanged(e);
}
private void HandleModelLayoutChanged(DependencyPropertyChangedEventArgs e)
{
    if (e.NewValue == null)
        return;
    if (e.NewValue is ModelLayoutType)
    {
        UpdateModelUI( );
    }
}
#endregion
```

This Property Used to Set the Superior Elements Relationship Line

```
#region SuperiorLineBrush Property
public static readonly DependencyProperty SuperiorLineBrushProperty =
DependencyProperty.Register(
    "SuperiorLineBrush",
    typeof(Brush),
    typeof(RelationshipViewerControl),
    new FrameworkPropertyMetadata(new SolidColorBrush(Colors.Black), new
PropertyChangedCallback(OnSuperiorLineBrushChanged))
);
public Line SuperiorLineBrush
{
    get { return Getvalue(SuperiorLineBrushProperty) as Line; }
    set { setValue(SuperiorLineBrushProperty, value); }
}
private static void OnSuperiorLineBrushChanged(DependencyObject o,
DependencyPropertyChangedEventArgs e)
{
    ((RelationshipViewerControl)o).HandleSuperiorLineBrushChanged(e);
}
private void HandleSuperiorLineBrushChanged(DependencyPropertyChangedEventArgs e)
{
    if (e.NewValue == null)
        return;
    if (e.NewValue is Brush)
    {
        this._superiorElementsDraw.LineBrush = e.NewValue as Brush;
        UpdateModelUI( );
    }
}
#endregion
```

This Property Used to Set the Subordinate Elements Relationship Line

```
#region SubordinateLineBrush Property
public static readonly DependencyProperty SubordinateLineBrushProperty =
DependencyProperty.Register(
    "SubordinateLineBrush",
    typeof(Brush),
    typeof(RelationshipViewerControl),
    new FrameworkPropertyMetadata(new SolidColorBrush(Colors.Black), new
```

```
PropertyChangedCallback(OnSubordinateLineBrushChanged))
  );
  public Line SubordinateLineBrush
  {
    get { return GetValue(SubordinateLineBrushProperty) as Line; }
    set { SetValue(SubordinateLineBrushProperty, value); }
  }
  private static void OnSubordinateLineBrushChanged(DependencyObject o,
DependencyPropertyChangedEventArgs e)
  {
    ((RelationshipViewerControl)o).HandleSubordinateLineBrushChanged(e);
  }
  private void HandleSubordinateLineBrushChanged(DependencyPropertyChangedEventArgs e)
  {
    if (e.NewValue == null)
      return;
    if (e.NewValue is Brush)
    {
      this._subordinateElementsDraw.LineBrush = e.NewValue as Brush;
      UpdateModelUI( );
    }
  }
}
#endregion
```

Relationship View Control Classes Defined in XAML

The following represents the actual definitions of the Element Templates in the XAML Binding and Definitions. This section shows the data source bindings to the Current Element, and Superior and Subordinate Element Relationships.

```
<relViewer:RelationshipViewerControl
x:Name="modelView"
CurrentElement="{Binding Source={StaticResource
relationalControlViewModel}, Path=CurrentElement, Mode=TwoWay,
UpdateSourceTrigger=PropertyChanged}"
SuperiorElementsSource="{Binding Source={StaticResource
relationalControlViewModel}, Path=SuperiorElements}"
SubordinateElementsSource="{Binding Source={StaticResource
relationalControlViewModel}, Path=SubordinateElements}"
```

Element Template Definition

This section shows an Element Template definition defined as a resource to the control that can be used by any other Element Template. In this case, we'll use it for the Superiors and Subordinate Element Types. The usage of this Element Template Definition is shown in the next section

```
<DataTemplate x:Key="defaultElementTemplate">
  <Border Padding="25,25,25,25"
Background="Transparent">
    <Border BorderThickness="1"
CornerRadius="8,8,8,8" BorderBrush="DimGray" Cursor="Hand"
ToolTip="{Binding Path=DisplayName}">
      <Border.Style>
        <Style TargetType="{x:Type Border}">
          <Style.Triggers>
            <Trigger Property="IsMouseOver"
Value="True" >
              <Setter
Property="Background" Value="{StaticResource
mouseOverSelectionBrush}"/>
            </Trigger>
            <Trigger Property="IsMouseOver"
Value="False">
              <Setter
Property="Background" Value="WhiteSmoke"/>
            </Trigger>
          </Style.Triggers>
        </Style>
```
```
      </Border.Style>
      <StackPanel Background="Transparent"
Margin="2" >
        <Image Name="typeImage"
HorizontalAlignment="Center" VerticalAlignment="Top"
Stretch="Fill" Height="24" Width="24" Source="{Binding
Path=ImagePath}" >
        </Image>
        <Label Background="Transparent"
Foreground="Black" HorizontalContentAlignment="Center"
VerticalAlignment="Bottom" Content="{Binding Path=DisplayName}"
></Label>
      </StackPanel>
    </Border>
  </Border>
</DataTemplate>
```

Subordinate and Superior Element Template References

This section shows the references to the Element Templates defined for the Superior and Subordinate Element types as well as the line definitions for both Element Types, and the Layout definition for the Relationship View and Relationships

```
SuperiorElementTemplate="{StaticResource
defaultElementTemplate}"
SubordinateElementTemplate="{StaticResource
defaultElementTemplate}"
SuperiorLineBrush="Gray"
SubordinateLineBrush="Goldenrod"
ModelLayout="{Binding ElementName=modelLayoutComboBox,
Path=SelectedItem}"
  >
```

Current Element Template Definition

This section shows the XAML definition for the Current Element Template which includes the visual layout and the binding details

```
<relViewer:RelationshipViewerControl.CurrentElementTemplate>
  <DataTemplate>
    <Border Padding="25,25,25,25"
```

```
Background="Transparent">
            <Border BorderThickness="1"
CornerRadius="8,8,8,8" BorderBrush="Red" Cursor="Hand"
ToolTip="{Binding Path=DisplayName}">
               <Border.Style>
                  <Style
TargetType="{x:Type Border}">
                     <Style.Triggers>
                        <Trigger
Property="IsMouseOver" Value="True" >
                           <Setter
Property="Background" Value="{StaticResource
mouseOverSelectionBrush}"/>
                        </Trigger>
                        <Trigger
Property="IsMouseOver" Value="False">
                           <Setter
Property="Background" Value="WhiteSmoke"/>
                        </Trigger>
                     </Style.Triggers>
                  </Style>
               </Border.Style>
               <StackPanel
Background="Transparent" Margin="2">
                  <Image
HorizontalAlignment="Center" VerticalAlignment="Top"
Stretch="Fill" Height="24" Width="24" Source="{Binding
Path=ImagePath}" />
                  <Label
Background="Transparent" HorizontalContentAlignment="Center"
VerticalAlignment="Bottom" Content="{Binding Path=DisplayName}"
/>
               </StackPanel>
            </Border>
         </Border>
      </DataTemplate>
   </relViewer:RelationshipViewerControl.CurrentElementTemplate>
</relViewer:RelationshipViewerControl>
```

Data Source Data Structures

Though the Relationship View control doesn't specify how the data provider must be structured, a prototype does have a data provider and the following code snippets represent its structure.

Data Provider Object

The following section and its subsections show the data structures for the Data Provider object.

```
public class FactModelElementsData:DependencyObject
{
   #region Data Members
   private XmlDocument _model = null;
   private XmlElement _docElement = null;
   #endregion
   #region Properties
```

Superior Elements Data Collection Property

```
   private ObservableCollection<FactModelElement>
_superiorElements;
   public ObservableCollection<FactModelElement>
SuperiorElements
   {
      get { return _superiorElements; }
      set { _superiorElements = value; }
   }
```

Subordinate Elements Data Collection Property

```
   private ObservableCollection<FactModelElement>
_subordinateElements;
   public ObservableCollection<FactModelElement>
SubordinateElements
   {
      get { return _subordinateElements; }
      set { _subordinateElements = value; }
   }
```

Current Element Data Property

```
   #region CurrentElement Dependency Property
   private FactModelElement _currentElement;
   public static readonly DependencyProperty
CurrentElementProperty = DependencyProperty.Register(
      "CurrentElement",
      typeof(object),
      typeof(FactModelElementsData),
      new FrameworkPropertyMetadata(new object( ), new
PropertyChangedCallback(OnCurrentElementChanged))
   );
   public object CurrentElement
   {
      get { return GetValue(CurrentElementProperty); }
      set { SetValue(CurrentElementProperty, value); }
   }
   private static void
OnCurrentElementChanged(DependencyObject o,
DependencyPropertyChangedEventArgs e)
   {
      try
      {
((FactModelElementsData)o).HandleCurrentElementChanged(e);
      }
      catch (Exception ex)
      {
         MessageBox.Show("OnCurrentElementChanged: " +
ex.Message, "Exception Caught");
      }
   }
   private void
HandleCurrentElementChanged(DependencyPropertyChangedEventArgs
e)
   {
      FactModelElement element = e.NewValue as
FactModelElement;
      PopulateUserControls(element.DisplayName);
   }
   #endregion
   #endregion
}
```

Superior and Subordinate Element Type Definition

The following code snippet defines the actual element type (class definition) for the Superior and Subordinate Element Types. In the case of the prototype they're both the same type under the hood though their Element Template definitions may have them rendered differently.

```
      public class RelatedElement
      {
         private string _displayName;
         public RelatedElement(string name)
         {
            _displayName = name;
         }
         public string DisplayName
         {
            get { return _displayName; }
```

```
set { _displayName = value; }
    }
}
```

In view of the many possible embodiments to which the principles of this invention may be applied, it should be recognized that the embodiments described herein with respect to the drawing figures are meant to be illustrative only and should not be taken as limiting the scope of the invention. Furthermore, the illustrative steps carried out by computer executable instructions provided/stored on a tangible computer-readable medium, may be modified, supplemented and/or reordered without deviating from the invention. It is furthermore noted that the inventions disclosed herein are alternatively presentable as: computer systems executing software code to received data, methods, and computer-readable media (e.g., tangible computer-readable media) containing computer-executable instructions for carrying out the claimed invention. Therefore, the invention as described herein contemplates all such embodiments as may come within the scope of the following claims, alternative embodiments disclosed but not yet claimed, and all equivalents thereof to the fullest extent permitted.

What is claimed is:

1. A method for displaying related data elements of a variety of data element types on a computer system including a graphical display, the method comprising:
    providing an element template collection defining user interface graphics for each of the data element types, said element template collection providing a base appearance definition for each of the data element types;
    providing a relationship view collection defining spatial relationships between a current element of a first specified type and a set of related data elements of at least a second specified type;
    providing a set of data elements, by a data provider, the set of data elements describing instances of data elements, each data element in the set of data elements having a corresponding data element type, each data element type having a corresponding template in the element template collection; and
    applying, by a relationship view control comprising computer-executable instructions stored on a computer-readable medium of the computer system, the element template collection and the relationship view collection to the set of data elements to render a layout view comprising a set of graphical elements corresponding to the set of data elements, said rendering comprising:
        generating the set of graphical elements corresponding to the set of data elements according to the element template collection, said generating comprising supplementing the base appearance definition corresponding to one or more of the data element types to include data provided by the data provider;
        displaying the generated set of graphical elements based on the base appearance definitions; and
        spatially arranging the set of graphical elements according to the spatial relationships between the current element and the set of related data elements.

2. The method of claim 1 further comprising:
    providing a user interface selection control enabling user-designation of one of the set of related data elements as a new current element; and
    in response, generating a new layout view by re-executing the applying step according to the new current element and a new set of related data elements.

3. The method of claim 1 further comprising providing a user interface selection control enabling user-designation of one of the set of related data elements for purposes of displaying information about the designated data element while maintaining unchanged the current element of the layout view.

4. The method of claim 1 wherein the data element types include an operation data element.

5. The method of claim 1 wherein the data element types include a process data element.

6. The method of claim 1 wherein data elements of a same type are displayed as a group.

7. The method of claim 1 wherein the element template collection and the relationship view collection are carried out according to a set of object classes.

8. A physical computer-readable medium storing computer-executable instructions for displaying related data elements of a variety of data element types on a computer system including a graphical display, said computer-executable instructions comprising instructions for:
    providing an element template collection defining user interface graphics for each of the data element types, said element template collection providing a base appearance definition for each of the data element types;
    providing a relationship view collection defining spatial relationships between a current element of a first specified type and a set of related data elements of at least a second specified type;
    providing a set of data elements, by a data provider, the set of data elements describing instances of data elements, each data element in the set of data elements having a corresponding data element type, each data element type having a corresponding template in the element template collection; and
    applying, by a relationship view control comprising computer-executable instructions stored on a computer-readable medium of the computer system, the element template collection and the relationship view collection to the set of data elements to render a layout view comprising a set of graphical elements corresponding to the set of data elements, said rendering comprising:
        generating the set of graphical elements corresponding to the set of data elements according to the element template collection, said generating comprising supplementing the base appearance definition corresponding to one or more of the data element types to include data provided by the data provider;
        displaying the generated set of graphical elements based on the base appearance definitions; and
        spatially arranging the set of graphical elements according to the spatial relationships between the current element and the set of related data elements.

9. The physical computer-readable medium of claim 8 wherein the steps further comprise:
    providing a user interface selection control enabling user-designation of one of the set of related data elements as a new current element; and
    in response, generating a new layout view by re-executing the applying step according to the new current element and a new set of related data elements.

10. The physical computer-readable medium of claim 8 wherein the steps further comprise providing a user interface selection control enabling user-designation of one of the set of related data elements for purposes of displaying information about the designated data element while maintaining unchanged the current element of the layout view.

11. The physical computer-readable medium of claim 8 wherein the data element types include an operation data element.

12. The physical computer-readable medium of claim 8 wherein the data element types include a process data element.

13. The physical computer-readable medium of claim 8 wherein data elements of a same type are displayed as a group.

14. The physical computer-readable medium of claim 8 wherein the element template collection and the relationship view collection are carried out according to a set of object classes.

15. A computer system for displaying related data elements of a variety of data element types, the computer system including:
   a graphical display;
   a processor; and
   a computer-readable medium having stored thereon computer-executable instructions for performing the steps of:
   providing an element template collection defining user interface graphics for each of the data element types, said element template collection providing a base appearance definition for each of the data element types;
   providing a relationship view collection defining spatial relationships between a current element of a first specified type and a set of related data elements of at least a second specified type;
   providing a set of data elements, by a data provider, the set of data elements describing instances of data elements, each data element in the set of data elements having a corresponding data element type, each data element type having a corresponding template in the element template collection; and
   applying, by a relationship view control comprising computer-executable instructions stored on a computer-readable medium of the computer system, the element template collection and the relationship view collection to the set of data elements to render a layout view comprising a set of graphical elements corresponding to the set of data elements, said rendering comprising:
   generating the set of graphical elements corresponding to the set of data elements according to the element template collection, said generating comprising supplementing the base appearance definition corresponding to one or more of the data element types to include data provided by the data provider;
   displaying the generated set of graphical elements based on the base appearance definitions; and
   spatially arranging the set of graphical elements according to the spatial relationships between the current element and the set of related data elements.

16. The computer system of claim 15 wherein the method further comprises:
   providing a user interface selection control enabling user-designation of one of the set of related data elements as a new current element; and
   in response, generating a new layout view by re-executing the applying step according to the new current element and a new set of related data elements.

17. The computer system of claim 15 wherein the method further comprises providing a user interface selection control enabling user-designation of one of the set of related data elements for purposes of displaying information about the designated data element while maintaining unchanged the current element of the layout view.

18. The computer system of claim 15 wherein the data element types include an operation data element.

19. The computer system of claim 15 wherein the data element types include a process data element.

20. The computer system of claim 15 wherein data elements of a same type are displayed as a group.

21. The computer system of claim 15 wherein the element template collection and the relationship view collection are carried out according to a set of object classes.

* * * * *